Sept. 20, 1938.  E. L. HARDER  2,130,842
POTENTIAL SOURCE COMPENSATION
Filed Nov. 12, 1937  2 Sheets-Sheet 1
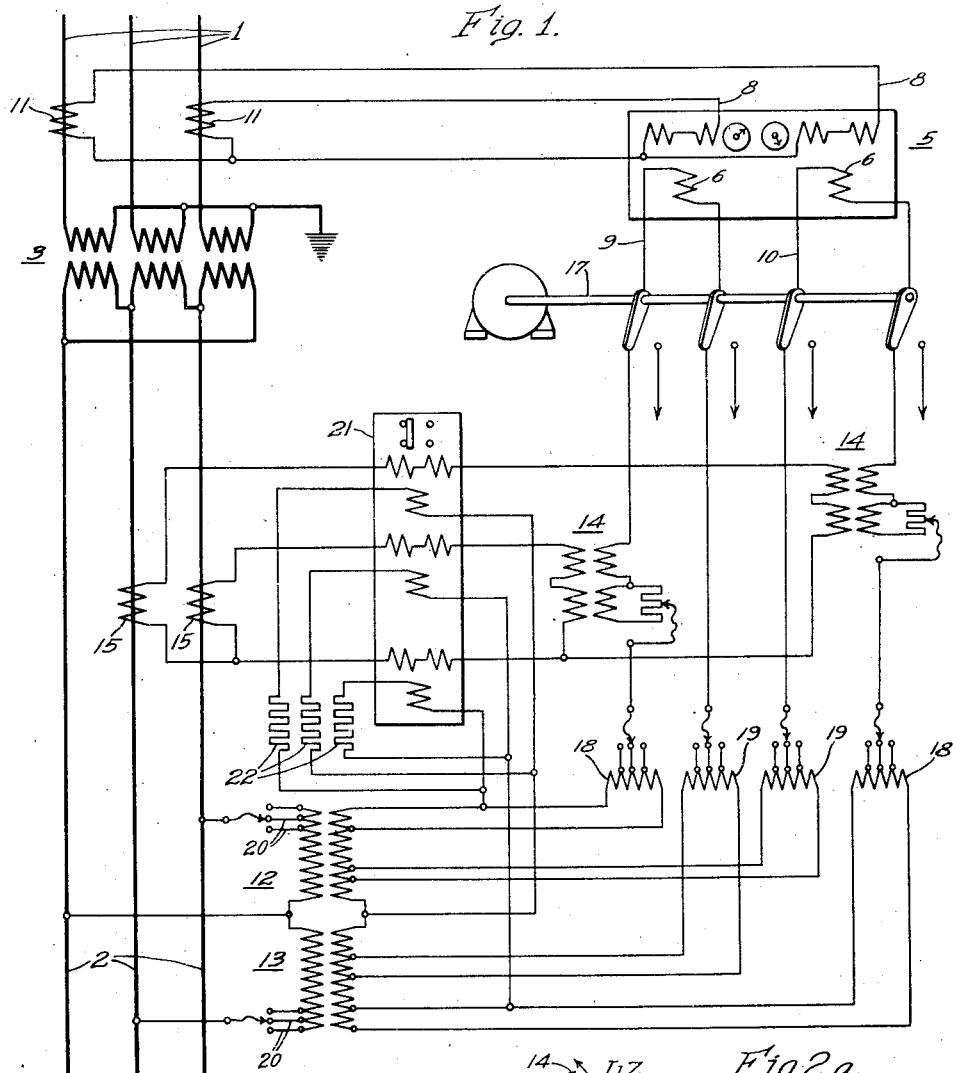
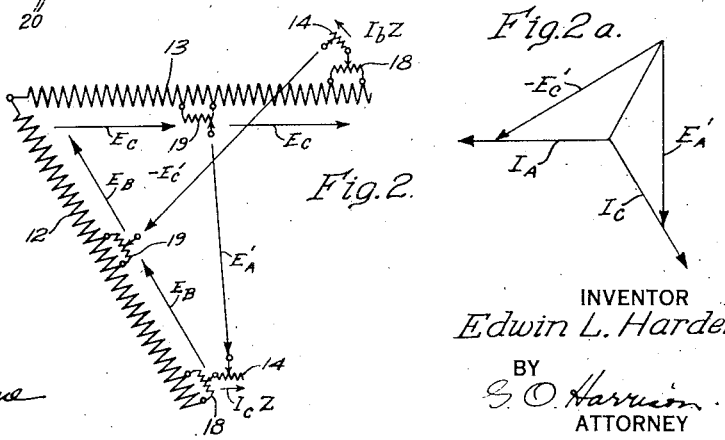
WITNESSES:
INVENTOR
Edwin L. Harder.
BY
ATTORNEY Sept. 20, 1938.   E. L. HARDER   2,130,842
POTENTIAL SOURCE COMPENSATION
Filed Nov. 12, 1937   2 Sheets-Sheet 2

WITNESSES:
C. J. Weller
Thus. C. Groome

INVENTOR
Edwin L. Harder.
BY
G. O. Harrison
ATTORNEY

Patented Sept. 20, 1938

2,130,842

UNITED STATES PATENT OFFICE 2,130,842

POTENTIAL SOURCE COMPENSATION

Edwin L. Harder, Forest Hills, Pa., assignor to Westinghouse Electric & Manufacturing Company, East Pittsburgh, Pa., a corporation of Pennsylvania Application November 12, 1937, Serial No. 174,197

12 Claims. (Cl. 171—97)

My invention relates to alternating current apparatus for deriving alternating variables, such as currents and voltages, from relatively high-voltage transmission or distribution circuits, for purposes of metering or relaying. Although not limited thereto, my invention is particularly applicable to such apparatus as applied for the measurement of power and energy quantities, in which applications a high degree of accuracy is required, as to both magnitude and phase angle, of the first degree alternating variables utilized as components of the measured quantity.

In apparatus of the type indicated above, mutual impedance devices such as instrument transformers, coupling capacitors or bushing potential devices are commonly used for deriving variables of reduced magnitude from the high-voltage power circuits, and ratio and phase angle errors result from the exciting and charging current of these devices, as well as from various impedance drops in the apparatus, included between the source and the meter.

It is an object of my invention to provide a novel expedient for use in the voltage circuits of apparatus of the type indicated above, which will conveniently provide correction of all the errors of ratio and phase angle, having a fixed magnitude independent of power load, which may arise in the metering apparatus, or in any associated equipment such as power transformers.

Another object of my invention is to provide a novel potential supply in which adjustment of the correction for magnitude and phase angle errors may be made at any time after the apparatus is installed.

A further object of my invention is to provide a novel metering installation having a plurality of potential sources, in which the voltage circuit of a meter is automatically transferred from one potential source to a second potential source when system conditions are such that the accuracy of the meter will be higher if it is energized from the second source.

Other objects of my invention will become evident from the following detailed description taken in conjunction with the accompanying drawings, in which Figure 1 is a diagrammatic view of a single polyphase power transformer installation together with associated metering apparatus embodying my invention.

Fig. 2 is a diagrammatic view showing the relationship of voltages existing during normal operation in the apparatus shown in Fig. 1.

Fig. 2A is a vector diagram showing the relationship of the voltage vectors of Fig. 2 to the line currents of circuit 1 (Fig. 1)

Figure 3:
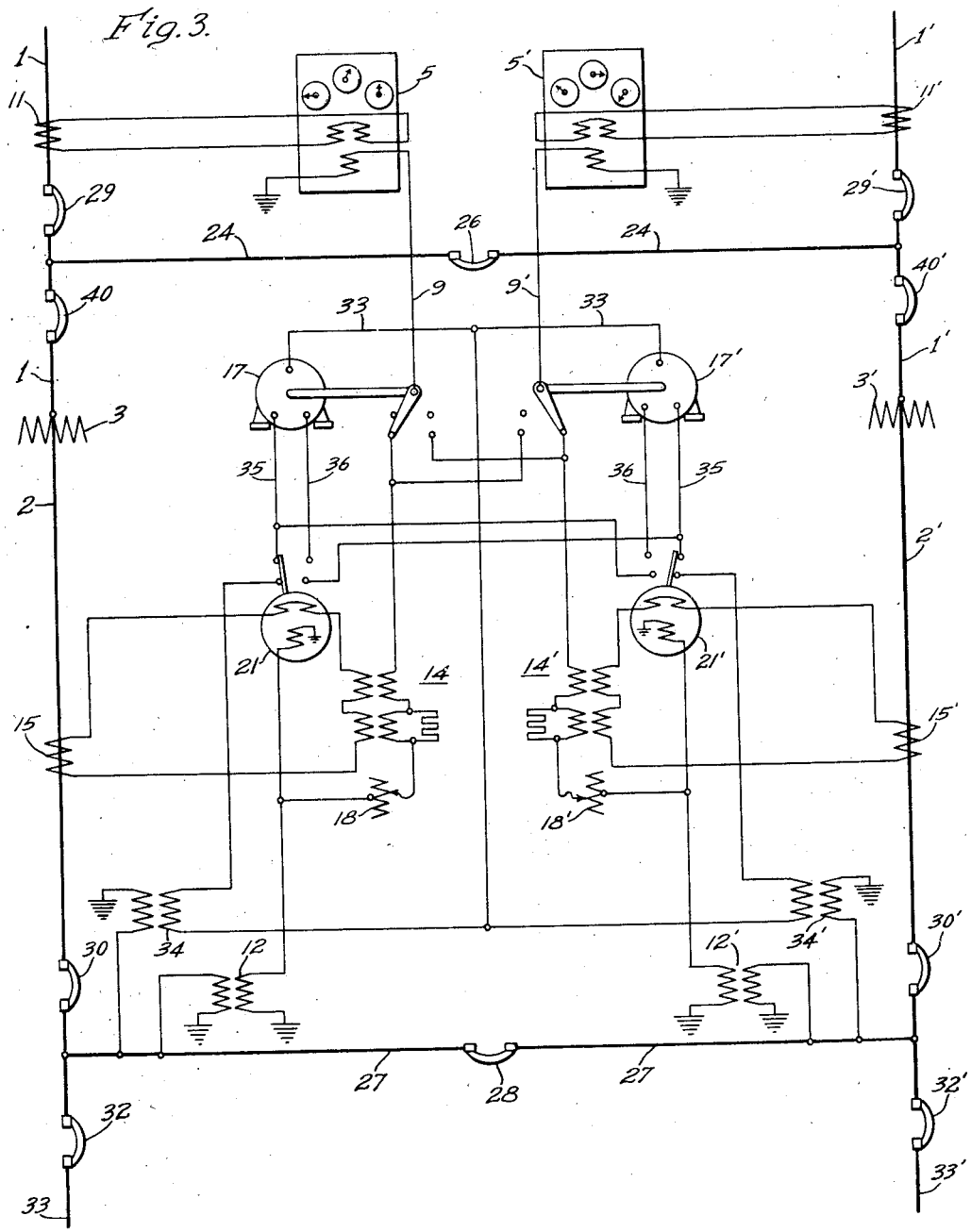
Fig. 3 is a diagrammatic view, in single-line form, of a plurality of power transformer installations, together with associated metering apparatus of the type shown in Fig. 1.

Referring to Figure 1 in detail, a high-voltage polyphase alternating-current supply circuit 1 is connected to a low-voltage polyphase alternating-current load circuit 2 by means of suitable power transformer apparatus 3, which may comprise a single polyphase transformer or a bank of single-phase transformers. The power transformer apparatus 3 is shown connected in star on the high-voltage side and in delta on the low-voltage side but may be connected in other ways well understood in the art.

With the transformer connections shown, it is possible to measure the power flow in the supply circuit 1 as a function of two phase currents of the latter circuit and two phase-to-phase voltages of the low-voltage circuit 2, provided that the transformer impedance constants have certain relationships, as explained in my prior Patent No. 2,071,834, granted Feb. 23, 1937, and assigned to Westinghouse Electric & Manufacturing Company. In accordance with the principle of the latter patent, it is necessary that the leakage impedance of the transformer high-voltage winding be equal in magnitude and phase angle in all three phases, and that a similar symmetrical relationship of the leakage impedances of the transformer low-voltage windings, and of the mutual impedances between high-voltage and low-voltage windings, exists. It will be assumed that these relationships are present in the power transformer apparatus 3.

The polyphase alternating-current supply circuit 1 is energized from a suitable source (not shown) in accordance with a system of voltages having a normally fixed relationship of magnitude and phase, such as the usual three-phase voltage system.

An alternating-current translating device 5, of a type responsive to the magnitude and phase relationship of a plurality of alternating energizing conditions supplied thereto, is associated with the transforming apparatus 3 to be energized in accordance with alternating electrical conditions derived from the polyphase alternating-current circuits 1 and 2. For purposes of illustration, it will be assumed that the translating device 5 is a polyphase watthour meter, but it will be apparent that the invention may be practiced with other forms of translating devices, the response of which is a function of two or more alternating variables and their relative phase angles.

The watthour meter 5 includes a plurality of phase elements 6, each of which is provided with a current circuit 8 and a voltage circuit 9 or 10, to be energized in accordance with variables determinative of the power flow in the supply circuit 1. In accordance with the principle of my prior patent, mentioned above, if the two current circuits 8 are energized proportionately with the phase currents $I_A$ and $I_C$ of the supply circuit 1, the corresponding voltage energization to be derived from the load circuit 2 may be expressed as $$E_A' = -2E_B - E_C + I_c Z \quad (1)$$

and $$-E_C' = -2E_C - E_B - I_b Z$$

where $I_A, I_B, I_C$ = phase currents in supply circuit 1.
$I_a, I_b, I_c$ = phase currents in load circuit 2.
$E_A', E_B', E_C'$ = phase-to-phase voltages of supply circuit 1.
$E_A, E_B, E_C$ = phase-to-phase voltages of load circuit 2.
$Z$ = total leakage impedance per phase of transformer 3 on low voltage base.

As the relationship stated in (1) is not directly involved in the present invention, proof thereof has been omitted, but may be found in my prior Patent No. 2,071,834 mentioned above.

A pair of current transformers 11, connected in the supply circuit 1, are provided for energizing the current circuits 8 in accordance with the phase currents $I_A$ and $I_C$. The voltage circuits 9 and 10 are energized from a pair of potential transformers 12 and 13, respectively, by means of connections to be hereinafter more fully described.

A pair of compensators 14, energized by means of a pair of current transformers 15, connected in the load circuit 1, are provided for supplying voltage components equivalent to the term $I_b Z$ and $I_c Z$ of (1), in the voltage circuits 9 and 10, respectively.

A motor-operated transfer switch 17 is provided for connecting the voltage circuits 9 and 10 to one or the other of two potential sources, depending upon which source will provide the greater accuracy. The operation of the transfer switch 17 will be explained in more detail in connection with Fig. 3.

As mentioned above, the present invention provides an adjustment for ratio and phase angle errors, such that all errors of the latter type, having a fixed magnitude independent of power load, which affect the response of the meter or other translating device may be corrected. This adjustment is accomplished by means of suitable mutual impedance apparatus connected to divide a portion of the secondary voltage of each potential transformer 12 and 13, so as to provide small correction components of voltage which may be added to the base components, (exemplified by the terms of Equation 1) to correct for the ratio and angle errors. In the embodiment illustrated, the mutual impedance apparatus takes the form of a plurality of tapped auto-transformers 18 and 19, preferably one pair of auto-transformers 18 and 19 being supplied for each potential transformer 12 and 13.

The auto-transformers 18 are connected to one end of each secondary winding of the potential transformers 12 and 13, and the auto-transformers 19 are connected at approximately the center of the corresponding secondary winding. The points on the potential transformer secondary windings at which the auto-transformers 18 and 19 are connected depends upon the basic metering connections, and for other metering connections than the one shown the auto-transformers 18 and 19 would be connected at other points.

Although, for simplicity, each auto-transformer 18 and 19 is shown as provided with three taps, the actual number of taps used in practice would be much larger in order to provide smaller increments of adjustment. The potential transformers 12 and 13 are preferably provided with primary taps 20 which serve to adjust the turn ratio of the corresponding transformer.

A three-phase power directional relay 21 is provided for controlling the motor-operated transfer switch 17. The potential circuits of the power directional relay 21 are connected to the secondary terminals of the line potential transformers 12 and 13 in series with suitable phase-shifting resistors 22, and the current circuits of the relay 21 are preferably energized from the current transformers 15. As such connections for providing directional energization of a power-responsive relay are well-known in the art, detailed description is omitted.

The operation of the apparatus shown in Fig. 1 may be better explained by reference to Fig. 2, which shows the secondary windings of potential transformers 12 and 13, the compensators 14 and the auto-transformers 18 and 19 developed to illustrate the vector relationship of voltages existing therein when the apparatus is in operation. In Fig. 2, the two vectors $E_B$ indicate the voltages existing between the center tap and the two end taps of the secondary winding of potential transformer 12, and, similarly, the two vectors $E_C$ denote the voltages developed in the two halves of the secondary winding of potential transformer 13. The compensating voltages developed by the compensators 14 are indicated by the vectors $I_b Z$ and $I_c Z$. It will be seen that the voltages $E_A'$ and $-E_C'$ applied to the voltage circuits 9 and 10 consists of the terms on the right side of the corresponding Equation (1) plus small phase displaced correction components produced by the auto-transformers 18 and 19. It will be evident that the auto-transformers 18 and 19 act as voltage dividing devices to subdivide a portion of the secondary voltages of the potential transformers 12 and 13 without appreciable change of phase angle of the latter voltages.

Considering the voltage $E_A'$ (applied to the voltage circuit 9), for example, it will be apparent that the auto-transformer 18 of potential transformer 12 produces a correction component affecting principally the magnitude of the total voltage vector $E_A'$, whereas the auto-transformer 19 of potential transformer 13 produces a correction component affecting principally the phase angle of the total voltage vector. It is immaterial that the correction components produced by the latter two auto-transformers 18 and 19 act in 60° relationship rather than at right angles, as the total correction to be obtained may be expressed as a vector distance on a coordinate plane having axes intersecting at 60° rather than 90°.

The phase relationship of the voltages $E_A'$ and $-E_C'$ of Fig. 2, as compared to phase currents $I_A$ and $I_C$ of circuit 1 (Fig. 1) for balanced non-inductive load, is illustrated in Fig. 2A. It will be seen that this relationship is that of the usual two-element power connection for watthour meters.

As indicated above, the auto-transformers 18 and 19 are preferably adjusted to correct all of the magnitude and phase angle errors, of fixed value independent of load, existing between the point at which power is to be measured and the meter. These errors are, preferably, evaluated individually by calculation or test, and the total required correction is secured by adding, as cartesian coordinates the in-phase and out-ofphase correction components required to offset the various errors. For the specific circuit shown, the errors which may be corrected by the auto-transformers are as follows:

1. The impedance drop produced by the flow of exciting current through the primary leakage impedance of the power transformer 3.
2. The departure of the actual turns ratio of the power transformer 3 from its nominal or name-plate turns ratio.
3. The ratio and phase angle errors of the potential transformers 12 and 13
   a. Resulting from the flow of potential transformer exciting current through the primary part of the potential transformer leakage impedance;
   b. Resulting from the flow of meter burden current through the leakage impedance of the corresponding potential transformer 12 or 13.
4. Impedance voltage drop produced by the flow of potential source current through the leakage impedance of each compensator 14 and its associated current transformer 15.
5. The departure of the actual turns ratio of the associated potential transformer 12 or 13 from its nominal or name-plate ratio.
6. The impedance voltage drop in the leads between each potential transformer 12 or 13 and its associated meter element 6.

Referring to Fig. 3, an entire installation for measuring the power supplied by two high-voltage polyphase alternating-current circuits 1 and 1', is shown therein in single-line diagrammatic form. The two supply circuits 1 and 1' are connected to two low-voltage polyphase alternating-current load circuits 2 and 2' by means of suitable power transformers 3 and 3', respectively.

The two supply circuits 1 and 1' are connected together by any suitable tie means, such as a polyphase circuit 24, having a tie circuit breaker 26 included therein. Similarly, the load circuits 2 and 2' are connected together by a polyphase tie bus 27 having a circuit breaker 28 therein.

A pair of high-voltage circuit breakers 29 and 29' are included in the supply circuits 1 and 1', respectively, for controlling the power flow therein, and a pair of low-voltage circuit breakers 30 and 30' are provided for a similar purpose in the load circuits 2 and 2'. A pair of circuit breakers 32 and 32' are provided for connecting the tie bus 27 to a pair of polyphase loads 33 and 33' which may be railway feeder sections, for example. In order to permit disconnection of the high-voltage windings of the transformers 3 and 3' from the bus 24, individual transformer circuit breakers 40 and 40' are provided.

The supply circuits 1 and 1' and the load circuits 2 and 2' may be considered as parts of a much larger power system such that the polyphase voltages normally available for energizing the supply circuits 1 and 1' are of approximately equal magnitude and substantially synchronized. Also, each of the railway sections 2 and 2' is normally energized, from other parts of the system, with voltage of substantially the same magnitude and phase position as that provided by the tie bus 27.

A polyphase watthour meter, or other translating device, 5 and 5', respectively, similar to the corresponding element of Fig. 1 but shown single-phase, is associated with each of the supply circuits 1 and 1'. The watthour meters 5 and 5' are energized by means of current transformer apparatus 11 and 11' and potential transformer apparatus 12 and 12' similar to the elements 11 and 12, respectively, of Fig. 1.

Compensator apparatus 14 and 14', low-voltage current transformer apparatus 15 and 15' and auto-transformer apparatus shown diagrammatically at 18 and 18', similar to the corresponding apparatus of Fig. 1, is provided for the same purposes as in the latter figure.

Polyphase power directional relays 21 and 21', similar to the relay 21 of Fig. 1 but shown in simplified form, are connected to respond to the power flow in the load circuits 2 and 2', respectively. The directional relays 21 and 21' are sufficiently sensitive to operate in response to the magnetizing losses of the associated power transformer 3 or 3', and are connected to control the energization of a pair of reversible motor-operated transfer switches 17 and 17'. The transfer switches 17 and 17' are provided with forward and reverse operating circuits 35 and 36, respectively, internally connected to a common return conductor 33, and are designed to remain in the position to which they were last operated, after deenergization, until again energized for operation in the opposite direction. The transfer switches 17 and 17' control the voltage circuits 9 and 9' of the watthour meters 5 and 5'.

The transfer switches 17 and 17' are energized from the two sections of the tie bus 27, respectively, by means of auxiliary transformers 34 and 34', respectively, through connections controlled by the power directional relays 21 and 21'. The latter relays and the transfer switches 17 and 17' are shown in the positions corresponding to power flow in the normal direction from the supply circuits 1 and 1', through the transformers 3 and 3' and load circuits 2 and 2', respectively, to the tie bus 27.

The operation of the apparatus shown in Fig. 3 may be set forth as follows: With the circuit breakers 29 and 29'; 30 and 30'; 32 and 32'; 26 and 28 all closed, as shown, and power being drawn by one or both loads 33 and 33', the voltages of both load circuits 2 and 2' are approximately the same because of the connection through the tie bus 27, and the energization of the watthour meters 5 and 5' is proportional to the power flow in the corresponding supply circuits 1 and 1', respectively.

If the circuit breakers 26 and 28 are both opened, the power circuits are separated symmetrically in the figure, and the two watthour meters 5 and 5' continue to register correctly.

With the circuit breaker 26 closed and circuit breakers 28 and 40 open, the transformer 3 would be energized from a remote part of the system through the load circuit 3, and its voltage would have no direct relationship to that of supply circuit 1. Under this condition, if the potential circuit 9 were permitted to remain connected to the potential transformer 12, the registration of meter 5 would be inaccurate. However, under this condition, the power corresponding to the magnetizing losses of the transformer 2 is supplied in reverse direction from the bus 27.

In response to the reverse power flow to the transformer 3, the reverse power relay 21 operates to energize the reverse connection 36 of the transfer relay 17, to thereby cause operation of the latter to its other position. The voltage circuit 9, accordingly, is transferred to the potential source energized from the load circuit 2'. Completion of this transfer establishes potential energization of the watthour meter 5 from the load circuit 2', the voltage of which is approximately the same as the voltage of supply circuit 1, to which it is directly connected.

The connections of the relays 21 and 21' and transfer switches 17 and 17' are such that if reverse power flow occurs simultaneously through both transformers 3 and 3', neither transfer switch 17 nor 17' is operated.

I do not intend that the present invention shall be restricted to the specific structural details, arrangement of parts or circuit connections herein set forth, as various modifications thereof may be effected without departing from the spirit and scope of my invention.

I claim as my invention:

1. In combination with a polyphase alternating-current circuit energized in accordance with a substantially symmetrical polyphase variable; an alternating-current translating device of a type responsive to the magnitude and phase relationship of a plurality of alternating energizing conditions supplied thereto, said translating device having an element to be energized in accordance with a predetermined phase of said symmetrical polyphase variable; energizing means for said translating device including a mutual impedance device for energizing said element in accordance with an alternating electrical condition derived from said circuit, said alternating electrical condition having a fixed relationship to said predetermined phase; a second mutual impedance device for deriving from said circuit a condition of said symmetrical polyphase variable displaced in phase from said predetermined phase; and means for correcting a ratio and phase angle error in the energization of said element comprising mutual impedance means for additionally energizing said element in accordance with a correction component derived from said second mutual impedance device.

2. In combination with a polyphase alternating-current circuit energized in accordance with a system of voltages having a normally fixed relationship of magnitude and phase, an alternating-current translating device of a type responsive to the magnitude and phase relationship of a plurality of alternating energizing conditions supplied thereto, said translating device having an element to be energized in accordance with a voltage of predetermined phase derived from said circuit; energizing means for said translating device including a potential source for energizing said element in accordance with an alternating voltage derived from said circuit, said alternating voltage having a fixed relationship to said predetermined phase; a second potential source for deriving from said circuit an alternating voltage displaced in phase from said predetermined phase; and means for correcting a ratio and phase angle error in the energization of said element including mutual impedance means for additionally energizing said element in accordance with an alternating correction voltage derived from said second source.

3. In combination with a polyphase alternating-current circuit energized in accordance with a system of voltages having a normally fixed relationship of magnitude and phase, an alternating-current translating device of a type responsive to the magnitude and phase relationship of a plurality of alternating energizing conditions supplied thereto, said translating device having a voltage circuit to be energized in accordance with a voltage of predetermined phase derived from said alternating-current circuit; energizing means for said translating device including a potential source for energizing said voltage circuit in accordance with an alternating voltage derived from said alternating-current circuit, said alternating voltage having a fixed relationship to said predetermined phase; a second potential source for deriving from said alternating-current circuit an alternating voltage displaced in phase from said predetermined phase; and means for correcting a ratio and phase angle error in the energization of said voltage circuit including mutual impedance means for additionally energizing said voltage circuit in accordance with an alternating correction voltage derived from said second potential source.

4. In combination with a polyphase alternating-current circuit energized in accordance with a substantially symmetrical polyphase voltage variable, alternating-current translating means comprising a plurality of elements for a plurality of phases, said translating means being of a type responsive to the magnitudes and phase relationship of a plurality of alternating energizing conditions supplied thereto; energizing means for said translating means comprising a plurality of potential sources for energizing said elements in accordance with a plurality of phases of a polyphase voltage condition derived from said circuit; and means for correcting a ratio and phase angle error in the energization of each of said elements comprising mutual impedance means for additionally energizing the corresponding element in accordance with a correction component derived from the voltage source for a different one of said phases.

5. In combination with a polyphase alternating-current circuit energized in accordance with a system of phase-displaced voltages having a normally fixed relationship of magnitude and phase, an alternating-current translating device of a type responsive to the magnitude and phase relationship of a plurality of alternating energizing conditions supplied thereto, said translating device having an element to be energized in accordance with a voltage of predetermined phase derived from said circuit; energizing means for said translating device including a potential source for energizing said element in accordance with an alternating voltage derived from said circuit, said alternating voltage having a fixed relationship to said predetermined phase; a second potential source for deriving from said circuit an alternating voltage displaced in phase from said predetermined phase; a voltage dividing device energized from said second potential source; and means for additionally energizing said element in accordance with a reduced output voltage of said voltage dividing device.

6. In combination with a polyphase alternating-current circuit energized in accordance with a system of phase-displaced voltages having a normally fixed relationship of magnitude and phase, an alternating-current translating device of a type responsive to the magnitude and phase relationship of a plurality of alternating energizing conditions supplied thereto, said translating device having an element to be energized in accordance with a voltage of predetermined phase derived from said circuit; energizing means for said translating device including a potential source for energizing said element in accordance with an alternating voltage derived from said circuit, said alternating voltage having a fixed relationship to said predetermined phase; a second potential source for deriving from said circuit an alternating voltage displaced in phase from said predetermined phase; an auto-transformer energized from said second potential source; and means for additionally energizing said element in accordance with an output voltage of said auto-transformer.

7. In combination with a polyphase alternating-current circuit energized in accordance with a substantially symmetrical polyphase voltage variable, alternating-current translating means comprising a plurality of elements for a plurality of phases, said translating means being of a type responsive to the magnitudes and phase relationship of a plurality of alternating energizing conditions supplied thereto; a plurality of potential transformers connected to said circuit to be energized in accordance with phase-displaced voltages thereof; a plurality of voltage dividing devices connected to output terminals of said potential transformers to be energized in accordance with output voltage conditions of the corresponding potential transformers; and voltage circuits for energizing each of said elements, each of said voltage circuits being connected to points of a plurality of said voltage dividing devices such that the corresponding element is energized in accordance with a voltage, corrected for ratio and phase angle errors, of a polyphase voltage system.

8. In combination with a polyphase alternating-current circuit energized in accordance with a substantially symmetrical polyphase voltage variable, alternating-current translating means comprising a plurality of elements for a plurality of phases, said translating means being of a type responsive to the magnitudes and phase relationship of a plurality of alternating energizing conditions supplied thereto; a plurality of potential transformers connected to said circuit to be energized in accordance with phase-displaced voltages thereof; a plurality of tapped auto-transformers connected to output terminals of said potential transformers to be energized in accordance with output voltage conditions of the corresponding potential transformers; and voltage circuits for energizing each of said elements, each of said voltage circuits being connected to taps of a plurality of said auto-transformers such that the corresponding element is energized in accordance with a voltage, corrected for ratio and phase angle errors, of a polyphase voltage system.

9. In an alternating-current system of transmission and distribution, a plurality of transformers including a selected transformer; a plurality of high-voltage circuits connected to said transformers, including a selected high-voltage circuit connected to said selected transformer; tie means for connecting said high-voltage circuits; a plurality of low-voltage circuits connected to said transformers, including a selected low-voltage circuit connected to said selected transformer; a translating device having a current circuit and a voltage circuit; means for energizing said current circuit in accordance with a current condition derived from said selected high-voltage circuit; means for normally energizing said voltage circuit in accordance with a voltage condition derived from said selected low-voltage circuit; and means responsive to an abnormal vector relationship of a current condition and a voltage condition of said selected transformer for energizing said voltage circuit in accordance with a voltage condition derived from another of said low-voltage circuits.

10. In an alternating-current system of transmission and distribution, a plurality of transformers including a selected transformer, a plurality of supply circuits for supplying power to said transformers, said plurality of supply circuits including a selected supply circuit connected to said selected transformer; tie means for connecting said supply circuits; a plurality of load circuits for deriving power from said transformers, including a selected load circuit connected to said selected transformer; additional alternating-current energizing means connected to said selected load circuit; a translating device having a current circuit and a voltage circuit; means for energizing said current circuit in accordance with a current condition derived from said selected supply circuit; means for normally energizing said voltage circuit in accordance with a voltage condition derived from said selected load circuit; and means responsive to an abnormal directional power condition of said selected transformer for energizing said voltage circuit in accordance with a voltage condition derived from another of said load circuits.

11. In an alternating-current system of transmission and distribution, a plurality of transformers; an individual high-voltage circuit connected to each of said transformers, tie means for connecting said high-voltage circuits; an individual low-voltage circuit connected to each of said transformers; a translating device for each of said transformers, each of said translating devices having a current circuit and a voltage circuit; means for energizing each of said current circuits in accordance with a current condition derived from the corresponding high-voltage circuit; and control means for said voltage circuits, said control means being effective when power flows through one of said transformers in the normal direction for energizing the associated voltage circuit from the low-voltage circuit corresponding to said one of said transformers, and being effective when power flows through the corresponding transformer in reverse direction for energizing the associated voltage circuit from a low-voltage circuit corresponding to a different transformer.

12. In an alternating-current system of transmission and distribution, a pair of transformers; an individual high-voltage circuit connected to each of said transformers; tie means for connecting said high-voltage circuits; an individual low-voltage circuit connected to each of said transformers; a power-responsive meter for each of said transformers, each of said meters having a current circuit and a voltage circuit; means for energizing each of said current circuits in accordance with a current condition derived from the corresponding high-voltage circuit; an individual potential supply source energized from each of said low-voltage circuits; and control means for said voltage circuits effective when power flows through both of said transformers in the normal direction to maintain connection of each of said voltage circuits to the corresponding potential supply source and effective when power flows through a single one of said transformers in reverse direction for transferring the connection of the corresponding voltage circuit to the other of said potential supply sources, said control means being ineffective to transfer connections when power flows through both of said transformers in reverse direction.

EDWIN L. HARDER.